(12) United States Patent
Puzio

(10) Patent No.: US 8,105,201 B2
(45) Date of Patent: Jan. 31, 2012

(54) FLEXING SHIFT WIRE FOR PTO ACTUATION

(75) Inventor: Daniel Puzio, Baltimore, MD (US)

(73) Assignee: Black & Decker Inc., Newark, DE (US)

(*) Notice: Subject to any disclaimer, the term of this patent is extended or adjusted under 35 U.S.C. 154(b) by 1148 days.

(21) Appl. No.: 11/911,015

(22) PCT Filed: Apr. 13, 2006

(86) PCT No.: PCT/US2006/013828
§ 371 (c)(1), (2), (4) Date: Oct. 9, 2007

(87) PCT Pub. No.: WO2006/113330
PCT Pub. Date: Oct. 26, 2006

(65) Prior Publication Data
US 2008/0190223 A1     Aug. 14, 2008

Related U.S. Application Data

(60) Provisional application No. 60/672,498, filed on Apr. 19, 2005.

(51) Int. Cl.
*F16H 57/08*     (2006.01)
(52) U.S. Cl. .................................................... 475/331
(58) Field of Classification Search .................. 475/299; 173/90, 91; 74/337.5
See application file for complete search history.

(56) References Cited

U.S. PATENT DOCUMENTS
2003/0141676 A1*  7/2003  Sakamaki et al. ............. 279/62
* cited by examiner

*Primary Examiner* — Edwin A Young
(74) *Attorney, Agent, or Firm* — Kofi Schulterbrandt; Scott B. Markow; Adan Ayala

(57) ABSTRACT

In a power driver, a shifter assembly includes: a housing; a ring gear mounted for rotation on the housing; a shift collar mounted for rotation on the housing; an elongated shifter structure coupled to the ring gear and the shift collar, the shifter structure including a misalignment compensator to compensate for misalignment between the ring gear and a feature cooperating with the ring gear.

28 Claims, 3 Drawing Sheets

FLEXING SHIFT WIRE FOR PTO ACTUATION

PRIORITY STATEMENT

This application claims the priority of U.S. Patent Application No. 60/672,498, filed on Apr. 19, 2005, the disclosure of which is incorporated herein in its entirety by reference.

Commonly-assigned, copending provisional Application, "TOOL CHUCK WITH POWER TAKE OFF FEATURE," was filed Sep. 16, 2005 with the USPTO and has been allotted U.S. Provisional patent application Ser. No. 11/227,200, and is hereafter referred to as "the '200 application." Commonly-assigned, copending provisional Application, "TOOL CHUCK WITH POWER TAKE OFF AND DEAD SPINDLE FEATURES," was filed Apr. 19, 2005 with the USPTO and has been allotted Ser. No. 60/672,503, and is hereafter referred to as the "the '503 application." The entirety of each of the '200 and '503 applications also is hereby incorporated by reference.

BACKGROUND OF THE INVENTION

Reduction systems of the transmissions of the Background Art Copending Applications may include a respective ring gear that is axially moveable to selectively operate the same. Each ring gear (e.g., 380s in FIG. 9 of the '200 application, or 12 in FIG. 2 of the '503 application) may respectively support a radially-oriented cam follower. For example, the outer surface of the ring gear may be provided with a continuous, circumferential groove (17 in FIG. 2 of the '503 application) in which may be located a shifter wire 101 (see Background Art FIG. 1, also, e.g., 312s in FIG. 9 of the '200 application, or 18 in FIG. 2 of the '503 application), ends of which function as cam followers.

Shifter wire 101 may be described as being similar in appearance to the Greek letter omega (Ω). Shifter wire 101 may be slidable through the circumferential groove. And shifter wire 101 may have a circular body portion 102 and free ends (or, in other words, ears) 104 and 106 that extend in a radial direction and out of the circumferential groove.

Ears 104 and 106 of shifter wire 101 may constitute cam followers for the corresponding ring gear. The cam followers may be received in respective slots (e.g., 313t, 315 or 313s in FIG. 9 of the '200 application) of a corresponding shift collar (e.g., 310 in FIG. 9 of the '200 application) mounted on a housing (e.g., a gear housing such as 395 in FIG. 9 of the '200 application). Such slots are at least partially circumferential. If one were to trace such slots circumferentially, each may be described as zigzagging relative to the axial direction, where such zigzagging defines a cam profile.

Upon rotating shift collar, the slots may axially move ears (cam followers) 104 and 106 (and thus the corresponding ring gears) to the desired axial positions. Via such movement of the ring gear(s), a change in the gear ratio of the transmission can be achieved.

To change the gear ratio, transmission parts must disengage and re-engage when the corresponding shift collar is rotated by a user. Sometimes, splines (also referred to as lugs or teeth) on a ring gear do not align sufficiently to a feature with which the ring gear is to cooperate (e.g., the teeth of a gear), thus restraining if not preventing the splines from meshing adequately (if at all) with the teeth. As a consequence, the shift collar feels to a user as if it is jammed. In that circumstance, the act of making a shift (by rotating the shift collar) cannot be completed until the user at least briefly energizes (or, in other words, blips) the motor of the power driver (e.g., drill). Blipping the motor causes a slight rotation (a small angular displacement) of the armature shaft thereof and the gears connected thereto, which results in a change of alignment of the teeth with respect to the splines. Such a small angular displacement is typically sufficient to permit the splines and teeth to adequately align, thus permitting completion of the shift.

Such misalignment and the need to blip the motor is perceived by some users as a nuisance.

SUMMARY

An embodiment of the present invention provides, in a power driver, a shifter assembly including: a housing; a ring gear mounted for rotation on the housing; a shift collar mounted for rotation on the housing; an elongated shifter structure coupled to the ring gear and the shift collar, the shifter structure including a misalignment compensator to compensate for misalignment between the ring gear and a feature cooperating with the ring gear.

An embodiment of the present invention provides, in a power driver, an elongated shifter structure including: a body having an arcuate shape; an intermediate portion extending from the body; a wing extending from the intermediate portion and circumferentially relative to the arcuate shape of the body; and an ear extending from the wing.

An embodiment of the present invention provides, in a shifter assembly of a power driver, the shifter assembly including a housing and a ring gear mounted for rotation on the housing, a shift collar including: an at least partial cylindrical segment, the segment including an at least partially circumferential channel to accommodate a portion of an elongated shifter structure.

An embodiment of the present invention provides a power driver including: a first housing; a motor mounted in the first housing; a transmission mounted in the housing and coupled to the motor, the transmission including the following, a second housing fixed to the first housing; a ring gear mounted for rotation on the second housing, a shift collar mounted for rotation on the second housing, and an elongated shifter structure coupled to the ring gear and the shift collar, the shifter structure including an misalignment compensators to compensate for misalignment between the ring gear and a feature cooperating with the ring gear.

Additional features and advantages of the present invention will be more fully apparent from the following detailed description of example embodiments, the accompanying drawings and the associated claims.

BRIEF DESCRIPTION OF THE DRAWINGS

The accompanying drawings are intended to depict example embodiments of the present invention and should not be interpreted to limit the scope thereof. The accompanying drawings are not to be considered as drawn to scale unless explicitly noted. Like elements are represented by like reference numerals.

DETAILED DESCRIPTION OF EXAMPLE EMBODIMENTS

Figure 1:
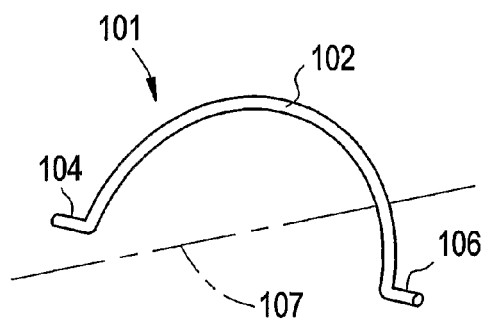
FIG. 1 is a schematic illustration of a shifter wire according to the Background Art.

It will be understood that if an element or layer is referred to as being "on," "against," "connected to" or "coupled to" another element or layer, then it can be directly on, against connected or coupled to the other element or layer, or intervening elements or layers may be present. In contrast, if an element is referred to as being "directly on", "directly connected to" or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In some of the figures, reference numbers are reused where the same component may be used in more than one drawing. After a component is initially introduced and discussed, repetitive discussion of the component is kept to a minimum for the sake of brevity. Rather, further discussion focuses upon the new context in which the component is depicted in the additional drawing(s).

Figure 2A:
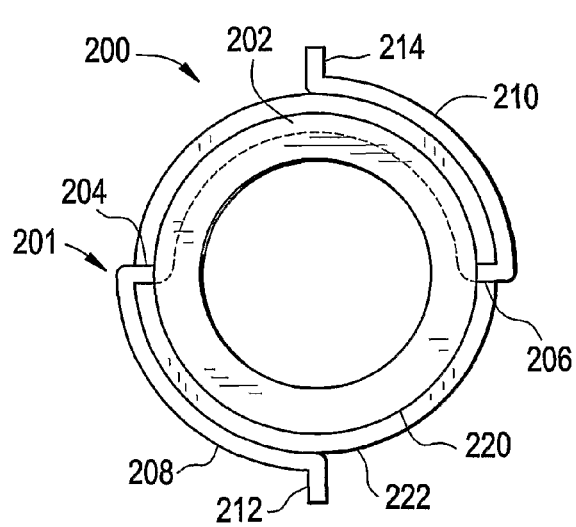
FIG. 2A is a front view of a partial shifter assembly according to an example embodiment of the present invention.
Figure 2B:
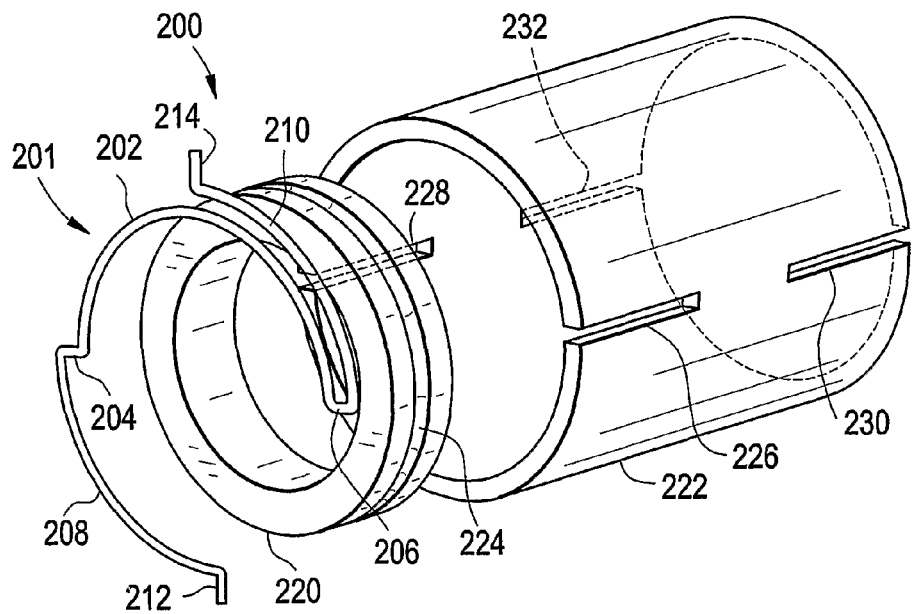
FIG. 2B is a three-quarter perspective, exploded view of the partial shifter assembly of FIG. 2A.

FIG. 2A is a front view of a partial shifter assembly 200 (according to an embodiment of the present invention) provided, e.g., for example in a transmission of a power driver such as a drill/driver device (not depicted). FIG. 2B is a three-quarter perspective, exploded view of partial shifter assembly.

In FIGS. 2A and 2B, partial shifter assembly 200 includes a rod-like shifter structure 201 (hereafter referred to as a shifter wire); a ring gear 220; and a cylindrical gear housing 222. Ring gear 220 may be fitted coaxially inside gear housing 222. A radially outer surface of ring gear 220 may be provided with a continuous, circumferential groove 224 in which may be located shifter wire 201.

Shifter wire 201 includes: a body portion 202; intermediate portions 204 and 206; wings 208 and 210; and free ends (or, in other words, ears) 212 and 214. Ears (free ends) 212 and 214 may function as cam followers.

Ends of body portion 202 are joined to proximal ends of intermediate portions 204 and 206, respectively. Intermediate portions 204 and 206 extend, e.g., radially relative to cylindrical gear housing 222. Distal ends of intermediate portions 204 and 206 are joined to proximal ends of wings 208 and 210, respectively. Distal ends of wings 208 and 210 are joined to ears 212 and 214, respectively. Ears 212 and 214 extend, e.g., radially relative to cylindrical gear housing 222.

Body portion 202 has an arcuate shape, e.g., a semicircle. Together, body portion 202 and intermediate portions 204 and 206 resemble a Greek letter omega (Ω), which has a trunk and two feet. As such, body portion 202 corresponds to the trunk and intermediate portions 204 and 206 correspond to the feet, respectively. A line defined between ears 212 and 214 can be described as substantially intersecting an origin of the arcuate shape of body portion 202. As a whole, shifter wire 201 can be described as planar.

Wing 210 may be described as doubling back upon (or, in other words, overlapping) body portion 202. More specifically, wing 210 can be described as extending circumferentially by overlapping a portion of body portion 202 such that a first half-plane, defined relative to and in which lies a first ray from an origin corresponding to the arcuate shape of body 202, intersects both wing 210 and body 202.

Wing 208 may be described as extending circumferentially beyond (so as not to overlap) body portion 202. More specifically, wing 208 can be described as extending circumferentially by substantially not overlapping a portion of body portion 202 such that a second half-plane, defined relative to and in which lies a second ray from the origin corresponding to the arcuate shape of body portion 202, does not intersect both wing 208 and body portion 202 proximal to intermediate portion 204.

In FIG. 2B, intermediate portions 204 and 206 are oriented, relative to the face of an analog clock, at about 9:00 and about 3:00, respectively. And ears 212 and 214 are oriented at about 6:00 and about 12:00, respectively. Gear housing 222 includes axially oriented slots 226, 228, 230 and 232. For example, gear housing 222 can be oriented rotationally around the longitudinal axis (e.g., of the drive train (not depicted) of the power driver (again, not depicted)) so that intermediate portions 204 and 206 extend through slots 226 and 228, respectively. A second ring gear and a second shifter wire (neither illustrated, for simplicity) could be provided with respect to correspondingly optional slots 230 and 232. Locating ears 212 and 214 substantially on opposite sides of the clock face can apply a substantially axially balanced force to ring gear 220. When not stressed, wings 208 and 210 are oriented substantially perpendicularly to the longitudinal axis.

Figure 3A:
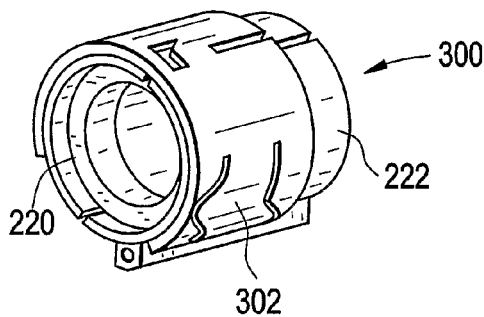
FIG. 3A is a three-quarter perspective front view of a shifter assembly according to an example embodiment of the present invention.
Figure 3B:
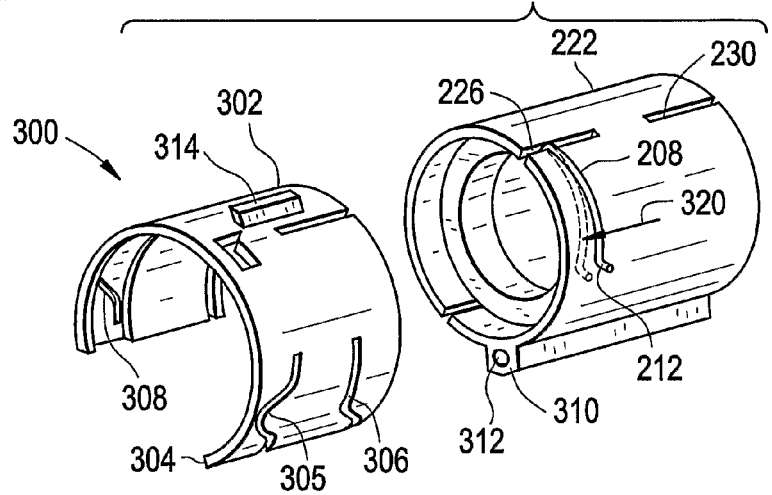
FIG. 3B is a three-quarter perspective, partially exploded view of the shifter assembly of FIG. 3A.
Figure 3C:
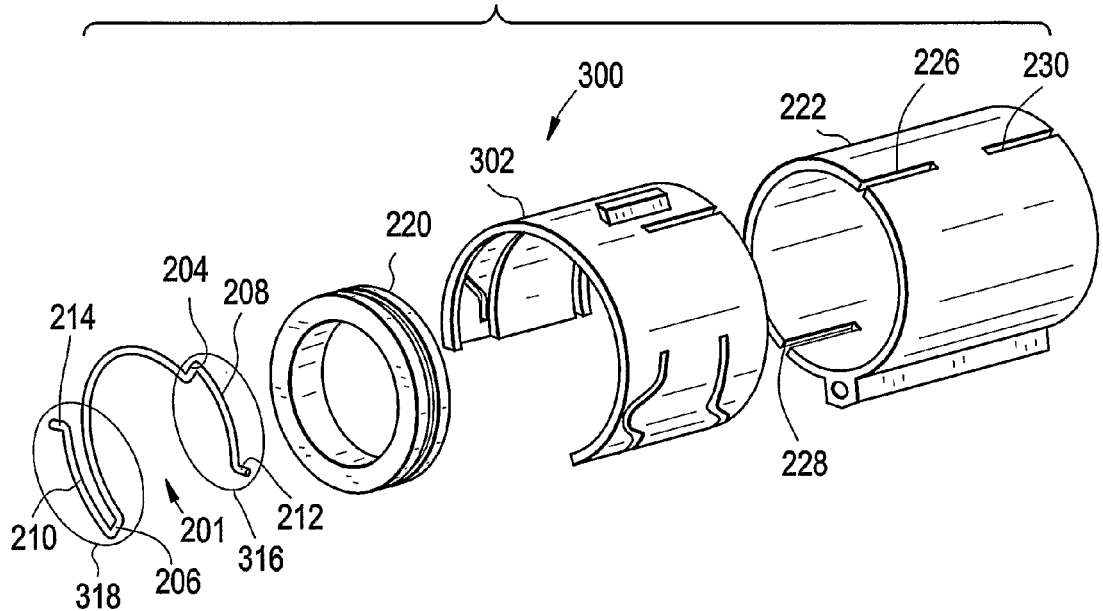
FIG. 3C is a three-quarter perspective, fully exploded view of the shifter assembly of FIG. 3A.

FIG. 3A is a three-quarter perspective front view of a shifter assembly 300 (e.g., for shifting gears in a transmission) according to an example embodiment of the present invention. FIG. 3B is a three-quarter perspective, partially exploded view of shifter assembly 300. FIG. 3C is a three-quarter perspective, fully exploded view of shifter assembly 300.

In FIG. 3A, shifter assembly 300 includes: ring gear 220; housing 222; and a shift collar 302. Shift collar 302 may be fitted coaxially against a radially outer surface of housing 222.

In FIGS. 3A, 3B and 3C, shift collar 302 is cylindrical, e.g., such that a front view would present less than an entire circle. The missing portion of (or, in other words, gap in) the cylinder is indicated via reference number 304. In FIGS. 3A-3C, it is assumed that the radially outer surface of gear housing 222 includes a flange 310 extending in the axial direction through gap 304. Flange 310 has hole 312 in which, e.g., can be received a clutch pin. In view of flange 310, gap 304 is larger than flange 310 so that shift collar 302 can be rotated around gear housing 222. Such rotation is facilitated by the provision of a flange 314 on a radially outer surface of shift collar 302.

Shift collar 302 includes at least partially circumferential slots 305, 306 and 308 (plus another slot corresponding to slot 308 that is obscured in FIGS. 3A-3C. If one were to trace slots 305, 306 and 308 circumferentially, each may be described as zigzagging relative to the axial direction, where such zigzagging defines a respective cam profile.

Relative to the orientation of partial shifter assembly 200 relative to the longitudinal axis as depicted in FIG. 2B, shifter assembly 300 has been rotated about 30° counterclockwise in FIG. 3A. FIGS. 3B and 3C have the same orientation as FIG. 3A. Also, relative to FIG. 2B, shifter wire 201 has been depicted as having a mirror-image orientation, as well as the counterclockwise rotation by about 30°.

As such, in FIGS. 3A, 3B and 3C, slots 226 and 230 of gear housing 222 are located at about 1:00 o'clock while slot 228 and slot 232 (obscured in FIGS. 3A, 3B and 3C) are located at about 7:00 o'clock. Thus, intermediate portions 204 and 206 are located at 1:00 o'clock and 7:00 o'clock, respectively.

Relative to corresponding parts of Background Art shifter wire 201, present shifter wire 201 additionally includes misalignment compensators, e.g., corresponding to the misalignment-compensating pair 316 that includes intermediate portion 204 & wing 208 and the misalignment-compensating pair 318 that includes intermediate portion 206 & wing 210.

Operation of the above-discussed shifting assemblies will now be discussed.

When a user desires to change the gear ratio, transmission parts (again), disengage and re-engage when corresponding a shift collar, e.g., 302, is rotated by a user. If splines (again, also referred to as lugs or teeth) on a ring gear, e.g., 220, do not align sufficiently to a feature with which the ring gear is to cooperate (e.g., teeth on a cooperating gear such as a carrier, here not depicted for simplicity of illustration), then the user can nonetheless rotate shift collar 302 to a desired position. This is because misalignment-compensating pair 316 (again, intermediate portion 204 & wing 208) and misalignment-compensating pair 318 (again, intermediate portion 206 & wing 210) elastically deform until at least slight energization of the motor (not shown) of the power driver (e.g., drill/driver) occurs thereby causing ring gear 220 to align sufficiently with the cooperating feature. Such deformation compensates for the misalignment, permitting shift collar 302 to be rotated to the desired position as if the respective teeth were adequately aligned. As an alternative to the example of the teeth of a carrier gear being the cooperating feature, the housing (not depicted, for simplicity) can be the cooperating feature. Yet other implementations of the cooperating feature are contemplated.

For example, deformation is shown in phantom for wing 208 in FIG. 3B, as called out by reference number 320.

Again, such energization will cause at least a slight rotation (a small angular displacement) of the motor's armature shaft (not shown) and the gears (not shown) connected to the motor. As a result, alignment of ring gear 220 with respect to the cooperating feature. Such a small angular displacement is typically sufficient to permit the splines and teeth to adequately align.

Rotation of shift collar 302 in the circumstance of such misalignment may restrict if not prevent ring gear 220 from being moved axially. Ears 212 and 214, as cam followers, nevertheless move as a result of the rotation shift ring 302. Such displacement of ears 212 and 214 may apply a torsional stress to intermediate portions 204 and 206 and/or a bending stress to wings 208 and 210, respectively. Energy transferred by the user's movement of shift collar 302, to the extent not dissipated by resulting axial movement of ring gear 220, is stored via the elastic deformation of misalignment-compensating pairs 316 and 318.

The elastic deformation of misalignment-compensating pairs 316 and 318 puts an axial bias load on ring gear 220. Once the armature shaft of the drill motor is displaced angularly, shifter wire 201 may dissipate its stored energy by pushing ring gear 220 into adequate engagement, thus completing the shifting action. Such elastic deflection, energy storage and delayed gear engagement may be transparent to the user. The need for the user to blip the motor may be reduced if not eliminated.

The elastic deformation mentioned above can also be described as a spring action. Shifter wire 201 may be constructed of, e.g., wire (such piano or music wire, a memory metal alloy such as Nitinol, etc.), fine-blanked sheet metal, a polymer, etc.

Deformation 320 depicted in FIG. 3B includes ear 212 being moved axially leftward (again, because shift collar 302 has been rotated axially). But intermediate portion 204 exhibits little if any axial displacement in the circumstance of misalignment with the cooperating feature because ring gear 220 has not moved a full corresponding amount axially despite rotation of shift collar 302. In such a circumstance, wing 208 forms an acute angle with respect to the longitudinal axis. To accommodate a need for such axial travel by ear 212 and corresponding travel by ear 214, a channel may be provided.

Figure 4A:
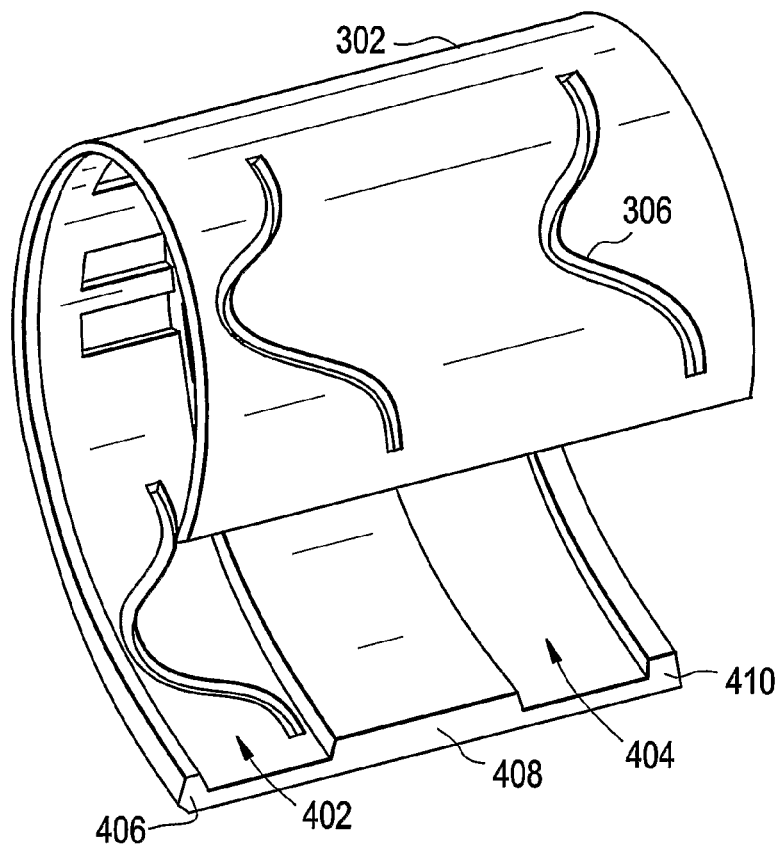
FIG. 4A is a more detailed three-quarter perspective view of the shift collar of FIGS. 3A-3C.
Figure 4B:
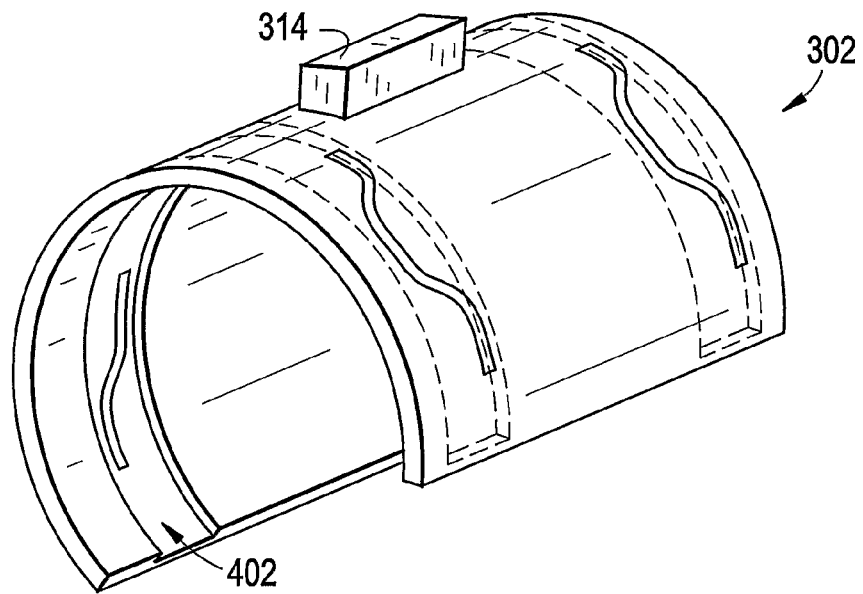
FIG. 4B is a three-quarter perspective view of the shift collar of FIG. 4A rotated about a longitudinal axis with respect to FIG. 4A.

FIG. 4A is a more detailed three-quarter perspective view of shift collar 302. FIG. 4B corresponds to FIG. 4A, but depicts shift collar 302 as being rotated about a longitudinal axis with respect to FIG. 4A.

In FIGS. 4A and 4B, a channel 402 and an optional channel 404 are depicted as being formed on the radially inward surface of shift collar 302. Channel 402 is significantly wider than shifter wire 201 in order to provide space for flex (or, in other words, axial travel) exhibited by misalignment-compensating pairs 316 and 318 as they undergo elastic deformation. Channel 404 would be included in shift collar 302 if a second ring gear and a second shifter wire (again, neither illustrated, for simplicity) were provided with respect to slots 230 and 232.

Channel 402 can be described as being formed between a circumferential flange 406 and a circumferential rib 408. Similarly, channel 404 can be described as being formed between a circumferential flange 410 and circumferential rib 408. Relative to a Background Art shift collar that does not provide such a channel, only a relatively small increase in thickness is experienced by shift 302 due to channel 402 (and optionally channel 404).

More particularly, channels 402 and 404 each can be described as having sides and a bottom. In each bottom of a channel are formed slots that can receive ears of a shifter wire. For example, channel 402 has slots that can receive ears 212 and 214 of shifter wire 201.

Shifting assemblies, such as the example embodiments described above, may facilitate easier transmission shift and reduce (if not eliminate) the perceived nuisance due to spline/teeth misalignment. Accordingly, a shift collar may be rotated to position representing a desired transmission setting regardless of whether spline/tooth alignment exists and regardless of whether corresponding transmission components are moved simultaneously.

With some embodiments of the present invention having thus been described, it will be obvious that the same may be varied in many ways. Such variations are not to be regarded as a departure from the spirit and scope of the present invention, and all such modifications are intended to be included within the scope of the present invention.

What is claimed is:

1. In a power driver, an elongated shifter structure comprising: a transmission mounted in a housing and coupled to the motor; a user operated actuator; a body having an arcuate shape; an intermediate portion extending from the body; a wing extending from the intermediate portion and circumferentially relative to the arcuate shape of the body; and an ear extending from the wing,
wherein a user may manipulate the actuator to change a gear ratio of the transmission via the body.

2. The shifter structure of claim 1, wherein the shifter structure is made from one of wire and fire-blanked sheet metal.

3. The shifter structure of claim 1, wherein at least one of the following is true: the wing extends circumferentially by overlapping a portion of the body such that a first half-plane, defined relative to and in which lies a first ray from an origin corresponding to the arcuate shape of the body, intersects both the wing and the body; and the wing extends circumferentially by substantially not overlapping a portion of the body such that a second half-plane, defined relative to and in which lies a second ray from the origin corresponding to the arcuate shape of the body, does not intersect both the wing and the body proximal to the respective intermediate portion.

4. The shifter structure of claim 1, wherein the shifter structure is substantially planar.

5. The shifter structure of claim 1, wherein: the arcuate shape is substantially a semicircle.

6. The shifter structure of claim 1, wherein: there are two intermediate portions, two wings and two ears; and a line defined between the two ears substantially intersects an origin of the arcuate shape.

7. The shifter structure of claim 1, wherein: the arcuate shape of the body has a radius relative to a center point; and the intermediate portion extends outwardly from the body relative to the center point.

8. The shifter structure of claim 7, wherein: the intermediate portion extends radially away from the body relative to the center point.

9. The shifter structure of claim 1, wherein: a Greek letter omega (Ω) has a trunk and two feet; and the body and the intermediate portion resemble the trunk and one foot of the Greek letter omega.

10. In a power driver, a shifter assembly comprising: a housing; a transmission mounted in the housing and coupled to the motor; a ring gear mounted for rotation on the housing; a shift collar mounted for rotation on the housing; an elongated shifter structure coupled to the ring gear and the shift collar, the shifter structure including a misalignment compensator to compensate for misalignment between the ring gear and a feature cooperating with the ring gear, wherein a user may manipulate the shift collar to change a gear ratio of the transmission via the elongated shifter structure.

11. The shifter assembly of claim 10, wherein: the shift collar includes an at least partially circumferential channel to accommodate the compensator.

12. The shifter assembly of claim 10, wherein: a width of the channel is significantly larger than a width of the compensator.

13. The shifter assembly of claim 10, wherein: the shifter structure further includes the following, a body having an arcuate shape, an intermediate portion extending from the body; the compensator includes the following, a wing extending from the intermediate portion and circumferentially relative to the arcuate shape of the body, and an ear extending from the wing.

14. The shifter assembly of claim 10, wherein the shifter structure is made from one of wire and fire-blanked sheet metal.

15. The shifter assembly of claim 10, wherein at least one of the following is true: the wing extends circumferentially by overlapping a portion of the body such that a first half-plane, defined relative to and in which lies a first ray from an origin corresponding to the arcuate shape of the body, intersects both the wing and the body; and the wing extends circumferentially by substantially not overlapping a portion of the body such that a second half-plane, defined relative to and in which lies a second ray from the origin corresponding to the arcuate shape of the body, does not intersect both the wing and the body proximal to the respective intermediate portion.

16. The shifter assembly of claim 10, wherein the shifter structure is substantially planar.

17. The shifter assembly of claim 10, wherein: the arcuate shape is substantially a semicircle.

18. The shifter assembly of claim 10, wherein: there are two intermediate portions, two wings and two ears; and a line defined between the two ears substantially intersects an origin of the arcuate shape of the body.

19. The shifter assembly of claim 10, wherein the misalignment compensator is elastically deformable.

20. In a shifter assembly of a power driver, the shifter assembly including a transmission mounted in the housing and coupled to the motor; a housing and a ring gear mounted for rotation on the housing, a shift collar comprising: an at least partial cylindrical segment, the segment including an at least partially circumferential channel to accommodate a portion of an elongated shifter structure,
wherein a user may manipulate the shift collar to change a gear ratio of the transmission.

21. The shifter assembly of claim 20, wherein: a width of the channel is significantly wider than a width of the elongated shifter structure.

22. The shifter assembly of claim 20, wherein the channel includes: sides; a bottom; and a slot in the bottom to receive a part of the elongated shifter structure.

23. The shifter assembly of claim 20, wherein: the channel is formed on an interior surface of the cylindrical segment.

24. A power driver comprising: a first housing; a motor mounted in the first housing; a transmission mounted in the housing and coupled to the motor, the transmission including the following, a second housing fixed to the first housing; a ring gear mounted for rotation on the second housing, a shift collar mounted for rotation on the second housing, and an elongated shifter structure coupled to the ring gear and the shift collar, the shifter structure including an misalignment compensators to compensate for misalignment between the ring gear and a feature cooperating with the ring gear, wherein a user may manipulate the shift collar to change a gear ratio of the transmission.

25. The shifter assembly of claim 24, wherein: the shift collar includes an at least partially circumferential channel to accommodate the compensator.

26. The shifter assembly of claim 25, wherein: a width of the channel is significantly larger than a width of the compensator.

27. The shifter assembly of claim 24, wherein: the shifter structure further includes the following, a body having an arcuate shape, an intermediate portion extending from the body; the compensator includes the following, a wing extending from the intermediate portion and circumferentially relative to the arcuate shape of the body, and an ear extending from the wing.

28. The shifter assembly of claim 24, wherein the feature cooperating with the ring gear is one of teeth on a carrier and a portion of the second housing.

* * * * *